B. W. STEELE.
PULVERIZER.
APPLICATION FILED AUG. 31, 1914.
1,187,791. Patented June 20, 1916.
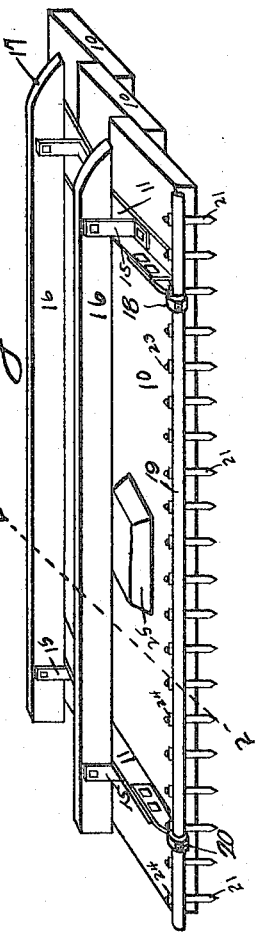
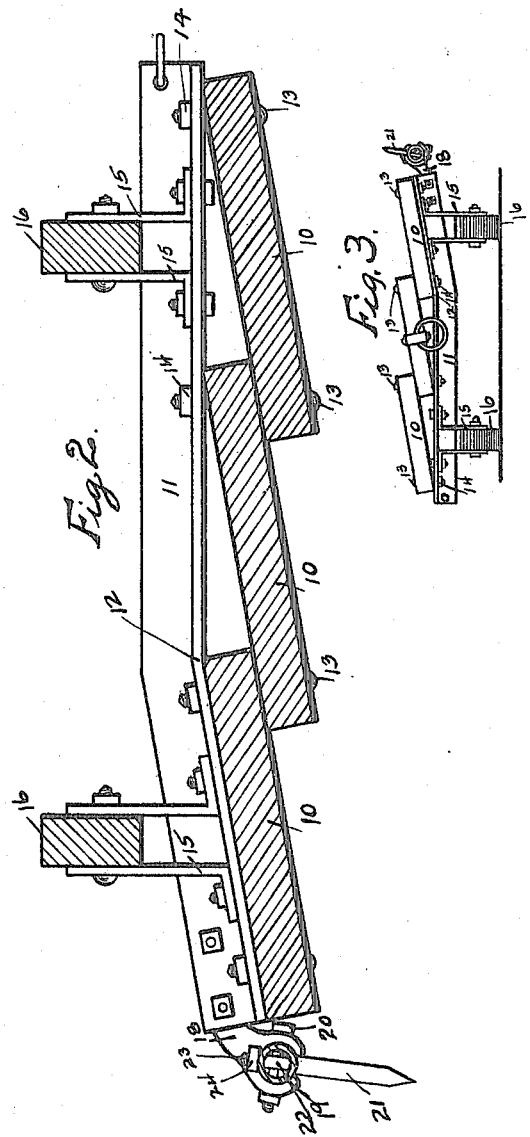
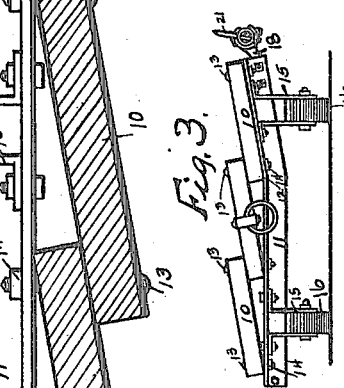
Witnesses.
Fred Altman.
Will Freeman.
Inventor.
Byram W. Steele
By Orwig & Bair
ATTYS

UNITED STATES PATENT OFFICE.

BYRAM W. STEELE, OF WINTERSET, IOWA.

PULVERIZER.

1,187,791.  Specification of Letters Patent.  Patented June 20, 1916.

Application filed August 31, 1914. Serial No. 859,542.

*To all whom it may concern:*

Be it known that I, BYRAM W. STEELE, a citizen of the United States, and resident of Winterset, in the county of Madison and State of Iowa, have invented a certain new and useful Pulverizer, of which the following is a specification.

The object of my invention is to provide a pulverizer of simple, durable and inexpensive construction, so built and arranged as to break up the larger clods or chunks of dirt into fine particles, and to break and smooth the ground and to then arrange the ground in narrow, parallel ridges.

My invention consists in certain details, in the construction, combination and arrangement of the various parts of the device, whereby the objects contemplated are attained, as hereinafter more fully set forth, pointed out in my claims, and illustrated in the accompanying drawings, in which:

Figure 1 shows a perspective view of a pulverizer embodying my invention. Fig. 2 shows a detail, sectional view of the same, taken on the line 2—2 of Fig. 1, and Fig. 3 shows a side elevation of the pulverizer in its inverted position.

In the accompanying drawing, I have used the reference numeral 10 to indicate heavy planks of which I preferably use three. The planks 10 are arranged transversely in the machine with their front edges tilted upwardly, as shown in the drawing. The front edge of the second and third planks rests on the upper surface of the first and second planks near their rear edges, as shown. For securing the planks together and giving the device proper rigidity, I have mounted above the planks an angle iron 11, the forward portion of which is substantially horizontal, and the rear end of which is inclined downwardly from a point at the forward edge of the rear plank 10, at 12. One angle of each angle iron 11 is secured to the planks 10 near their forward edges by means of the bolts 13 and nuts 14. I preferably use two of said angle irons spaced apart from each other and arranged longitudinally in the machine, as shown in Fig. 1. Secured to the angle irons 11, preferably above the first and third planks, are upwardly extending brackets 15, arranged in pairs. Mounted in the brackets 15 are a pair of parallel runners 16, arranged transversely in the machine. The forward ends of the runners 16 are beveled at 17.

Secured to the upwardly extending flanges of the angle irons 11 at their rearward ends are rearwardly and downwardly extending brackets 18. In the brackets 18 is mounted a transversely arranged pipe or tube 19, which is fixed against rotation by means of bolts 20, extending through said brackets and through said pipe, as shown in Fig. 2.

For making the narrow, parallel ridges in the ground hereinbefore referred to, a plurality of harrow teeth are provided, each comprising a tooth portion 21 and an upwardly extending shank portion 22 of smaller diameter than the tooth portion 21. The shank 22 is extended through suitable openings in the pipe 19 and its upper end is screw threaded at 23, to receive a nut 24. The harrow teeth are inclined downwardly and slightly rearwardly, as illustrated in Fig. 2.

My improved pulverizer is preferably used with a weight 25 on the rear plank 10, whereby the teeth 21 are forced into the ground. As a matter of fact, the driver usually stands on the rear plank 10, thereby furnishing the proper weight, but if desired, the weight 25 may be used. The weight 25 should be adjustable forwardly and rearwardly and also laterally for securing the proper action of the pulverizer.

The advantage of the use of a pulverizer such as that herein described, lies in the fact that the planks 10 thoroughly break up the dirt into fine particles and level the surface of the field. The smooth, level surface is then cut into narrow, parallel ridges of well broken up and well cultivated dirt. The forming of the ground into ridges in many sections of the country puts it into the best condition for raising a crop. With ordinary drags and harrows, if there should be a rain after the ground has been dragged, and left smooth, the soil is packed, leaving it in worse condition than before dragging.

With my improved pulverizer, the ground is smoothed and then left in the narrow ridges and furrows, in which condition the furrows carry off the water and the ridges are properly drained and dry. The soil is thereby better aerated than when otherwise prepared and is left mellow and loose, without being baked by the sun after the rain. When the harrow is dragged from place to place, it is simply turned over and drawn along on the runners.

It will be understood that some changes may be made in my improved pulverizer without departing from its essential features and purposes and it is my intent to cover by this application any such changes which may be included within the scope of my claims.

I claim as my invention:

1. In a device of the class described, a plurality of flat members transversely arranged in the device, each tilted downwardly and rearwardly, brackets projecting rearwardly from the device, a tube therein, bolts extended through said tube and said brackets, teeth having their upper ends reduced in diameter and extended through said tube, and nuts on said upper ends above said tube.

2. In a device of the class described, a plurality of flat members arranged transversely in the device, each being tilted downwardly and rearwardly, the flat members being arranged in succession from front to rear, with the forward end of each rearward member overlapping the rearward end of each forward member, a pair of longitudinally arranged frame members inclined downwardly and rearwardly at their rearward ends, said frame members having right-angled flanges at their lower edges to engage the flat members, bolts extended through two flat members at the overlapping portions thereof, and through said flanges, brackets extending rearwardly from said frame members, a transverse member fixed in said brackets, and a plurality of harrow teeth fixed in said transverse member.

Des Moines, Iowa, August 15, 1914.

BYRAM W. STEELE.

Witnesses:
J. W. McKee,
S. C. Lochrine.

Copies of this patent may be obtained for five cents each, by addressing the "Commissioner of Patents, Washington, D. C."